US009208376B2

(12) United States Patent
Chakravarty et al.

(10) Patent No.: US 9,208,376 B2
(45) Date of Patent: Dec. 8, 2015

(54) IDENTIFICATION OF PEOPLE USING MULTIPLE SKELETON RECORDING DEVICES

(71) Applicant: TATA CONSULTANCY SERVICES LIMITED, Mumbai, Maharashtra (IN)

(72) Inventors: Kingshuk Chakravarty, West Bengal (IN); Aniruddha Sinha, West Bengal (IN); Diptesh Das, West Bengal (IN); Rohan Banerjee, West Bengal (IN); Amit Konar, Kolkata (IN); Sudeepto Dutta, Dist. Darjeeling (IN)

(73) Assignee: TATA CONSULTANCY SERVICES, Mumbai (IN)

( * ) Notice: Subject to any disclaimer, the term of this patent is extended or adjusted under 35 U.S.C. 154(b) by 0 days.

(21) Appl. No.: 14/280,353

(22) Filed: May 16, 2014

(65) Prior Publication Data
US 2014/0341439 A1   Nov. 20, 2014

(30) Foreign Application Priority Data

May 17, 2013   (IN) .......................... 1769/MUM/2013

(51) Int. Cl.
*G06K 9/00*   (2006.01)
*G06K 9/44*   (2006.01)
*G06K 9/62*   (2006.01)

(52) U.S. Cl.
CPC .............. *G06K 9/00348* (2013.01); *G06K 9/44* (2013.01); *G06K 9/627* (2013.01)

(58) Field of Classification Search
CPC ........................... G06K 9/00348; G06K 9/627
USPC .......................................... 382/115, 107, 103
See application file for complete search history.

(56) References Cited

U.S. PATENT DOCUMENTS

| 2004/0228503 | A1* | 11/2004 | Cutler ........................... 382/103 |
| 2006/0018516 | A1* | 1/2006 | Masoud et al. ............... 382/115 |
| 2011/0026849 | A1* | 2/2011 | Kameyama ................... 382/260 |
| 2014/0003710 | A1* | 1/2014 | Seow et al. ................... 382/159 |

OTHER PUBLICATIONS

Lee et al: "Gait analysis for recognition and classification", proc. of IEEE, 2002.*
Wang et al: "Silhouette analysis-based gait recognition for human identification", PAMI-IEEE, 2003.*
Wittenberg, "Performance and Motion Capture using Multiple Xbox Kinects", Rochester Institute of Technology, Dec. 2013, 18 pages.

\* cited by examiner

*Primary Examiner* — Ruiping Li
(74) *Attorney, Agent, or Firm* — Lee & Hayes, PLLC

(57) ABSTRACT

Method(s) and system(s) for identification of an unknown person are disclosed. The method includes receiving skeleton data comprises data of multiple skeleton joints of the unknown person from skeleton recording devices. The method further includes extracting G gait feature vectors from the skeleton data. Further, the method includes classifying each gait feature vector into one of N classes based on a training dataset for N known persons and computing a classification score for each class. The method also includes clustering the training dataset into M clusters based on M predefined characteristic attributes of the known persons, tagging each gait feature vector with one of the M clusters based on a distance between a respective gait feature vector and cluster centers of M clusters, and determining a clustering score for each M cluster. The method further includes identifying the unknown person based on clustering scores and classification scores.

20 Claims, 2 Drawing Sheets

IDENTIFICATION OF PEOPLE USING MULTIPLE SKELETON RECORDING DEVICES

TECHNICAL FIELD

The present subject matter relates, in general, to identification of people and, in particular, to a system and a method for identification of people using multiple skeleton recording devices.

BACKGROUND

In recent years, the importance of systems facilitating automatic identification of people has increased. Such systems play a decisive role in surveillance scenarios, for example, in monitoring of high security areas like banks and airports. An example of one such system is an automatic gait recognition system.

Automatic gait recognition system is a biometric system for identifying a person based on the person's style of walking. Unlike other biometrics, such as systems utilizing iris, fingerprint, and facial expression, walking style of the person can be captured at a distance and is hard to hide or to imitate which makes it an unobtrusive tool for identification. Further, identification of the person based on gait or walking style of the person does not require cooperation and attention of the person. These aspects of the gait identification system help in surveillance scenarios where the person's cooperation is not expected and the person's awareness is not desired at all.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
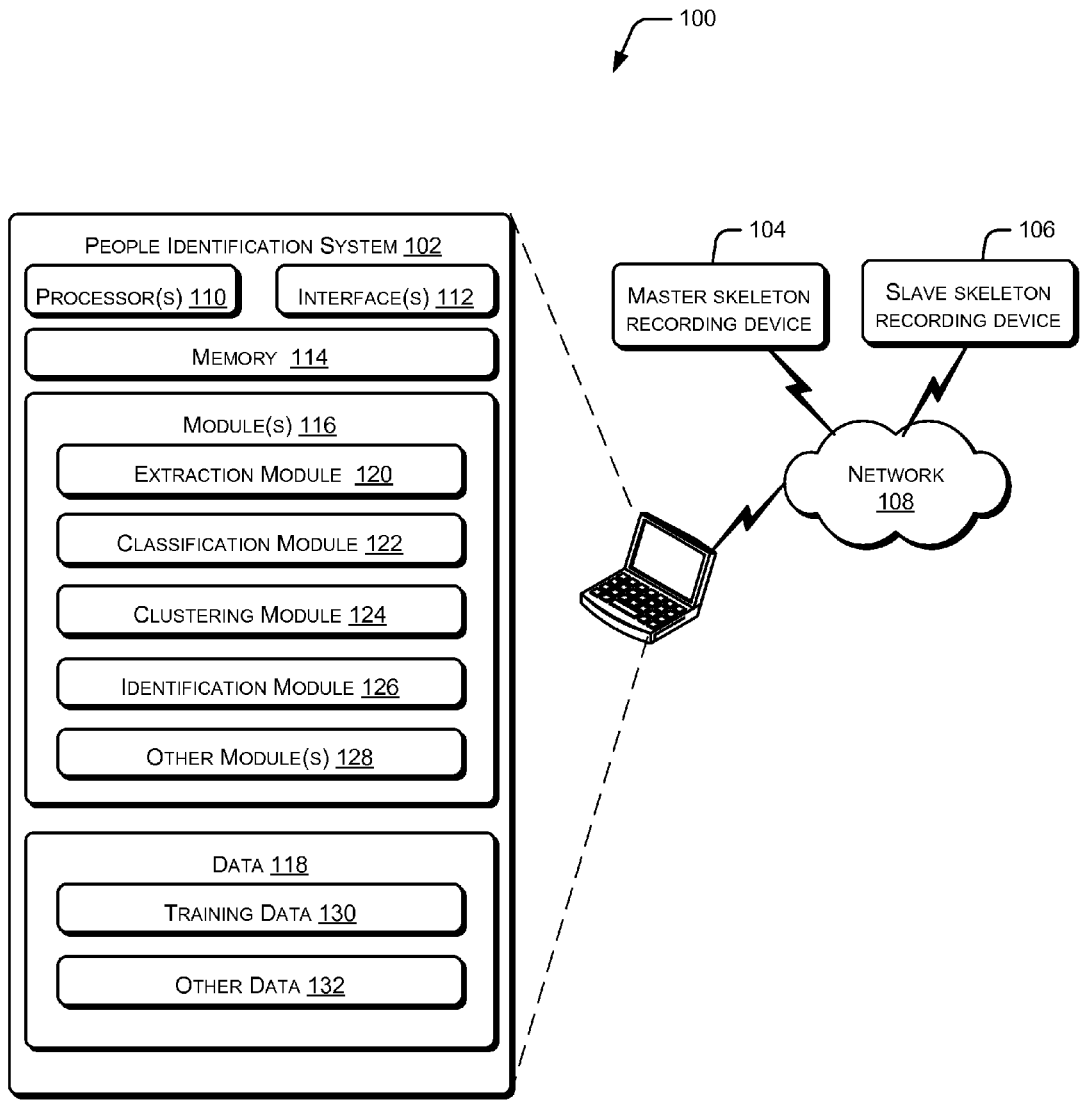
FIG. 1 illustrates a network environment implementing a people identification system, according to an embodiment of the present subject matter.

Various systems for identifying people based on their behavioral characteristics, such as walking style or walking pattern have been developed in past few years. Such systems identify an unknown person using a skeleton recording device having an Infra-red (IR) camera. The skeleton recording device captures a skeleton model of the unknown person while the unknown person is performing a walking activity in front of the skeleton recording device. Thereafter, a feature set that uniquely identifies the unknown person based on his walking activity is determined from the skeleton model. The unknown person can then be identified based on the feature set.

Such systems, however, uses a single skeleton recording device to identify the unknown person. The skeleton recording device typically has a limited field of view of about 43° vertical by 57° horizontal field of view. In case the walking movement of the unknown person is partially or completely outside the field of view of the skeleton recording device, the systems fail to identify the unknown person.

Few attempts have been made in the past to use multiple skeleton recording devices in order to have a wider field of view. However, such attempts have been unsuccessful in identifying the unknown person as it is difficult to manage the skeleton data from multiple skeleton recording devices having different views, different capturing timings, etc. Also, multiple skeleton recording devices introduce a substantial noise into the skeleton data obtained therefrom resulting in inaccuracies or errors in identification of the unknown person. Further, due to the complexity in processing the skeleton data obtained from the multiple skeleton recording devices, identification of the person in real-time is difficult.

In accordance with the present subject matter, a system and a method for identification of an unknown person, from amongst N known persons using multiple skeleton recording devices is described. For the purpose of identification of an unknown person, the system of the present subject matter is trained initially over N known person. Then the unknown person, from amongst the N known persons, can be identified through the system. In an implementation, identification of an unknown person is performed in real-time, however, the training of the system may or may not be performed in real-time.

In an implementation, for training the system, skeleton data of each of the N known persons is received from a plurality of skeleton recording devices. In an example, the skeleton recording devices may be Kinect® devices. In one implementation, each of the skeleton recording devices may capture three-dimensional (3D) skeleton models of a known person when the known person is performing a walking activity in front of the skeleton recording device. A 3D skeleton model of a known person may represent skeleton data comprising multiple skeleton joints of the known person. In one example, the multiple skeleton joints include a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

Since each skeleton recording device may have a separate co-ordinate system, the system may map the skeleton data from the plurality of skeleton recording devices into a single co-ordinate system. In one implementation, the skeleton data obtained from a skeleton model, captured by one skeleton recording device, is linearly shifted with respect to the skeleton data obtained from a skeleton model, captured by another skeleton recording device, so that the skeleton data can be mapped into a single co-ordinate system.

The skeleton data associated with the multiple skeleton joints for each known person is processed separately to extract one or more predefined gait feature sets. Each predefined gait feature set is unique to a known person, and may include static and dynamic gait features, such as area related gait features, angle related gait features, dynamic centroid distance related gait features, and speed related gait features. The set of predefined gait features for each known person can be represented as a vector and is referred to as a training gait feature vector, based on which the system is trained. In an implementation, G training gait feature vectors are extracted from the skeleton data, where G can be 1 or more, for example, 40, depending on the time duration for which the skeleton data is captured and received from the plurality of skeleton recording devices. The system is thus trained based on G training gait feature vectors for each known person so as to identify an unknown person from the known persons.

Once the G training gait feature vectors are extracted for each of the known persons, the training gait feature vectors are populated in a training dataset and the system is trained for the training dataset using a classifier. In one example, the classifier may be a Support Vector Machine (SVM) classifier that may generate at least one training model based on the training dataset for training the system. The SVM classifier is a supervised learning classifier having learning algorithms which are used for classification of data.

In an implementation, for identification of an unknown person in real-time, skeleton data of the unknown person is received from the plurality of skeleton recording devices. The unknown person to be identified may be from amongst the known persons for which the system is trained. In an implementation, the skeleton recording devices capture 3D skeleton models of the unknown person. In one example, the plurality of skeleton recording devices include one master skeleton recording device and at least one slave skeleton recording device. In said example, the master skeleton recording device controls the working of the at least one slave skeleton recording device based on the appearance of a person in front of the master skeleton recording device.

In one implementation, the skeleton data obtained from a skeleton model, captured by one skeleton recording device, is linearly shifted with respect to skeleton data obtained from a skeleton model, captured by another skeleton recording device, so that the skeleton data can be mapped into a single co-ordinate system. Thereafter, joint coordinates of each of the skeleton joints are determined from the skeleton data of the unknown person. In one example, Cartesian x, y, and z joint coordinates of each of the skeleton joints are determined from the skeleton data. Once the joint coordinates of the skeleton joints are determined, G gait feature vectors are extracted from the skeleton data of the unknown person. In an implementation, the skeleton data for the unknown person is captured and received from the plurality of skeleton recording devices, such that about 40 gait feature vectors (G=40) are extracted. In an example, a gait feature vector may include static and dynamic gait features, such area related gait features, angle related gait features, dynamic centroid distance related gait features, and speed related gait features.

Further, each of the G gait feature vectors are classified into one of N classes based on the training dataset for the N known persons. In an example, a class, from the N classes, represents one of the N known persons. Subsequently, a classification score is computed for each of the N classes. The classification score for a respective class is a number of gait feature vectors classified in the respective class divided by G. In an example, the G gait feature vectors are classified using an SVM classifier.

Once the classification scores are computed, the training dataset for the N known persons is clustered into M clusters based on M predefined characteristic attributes of the N known persons. A cluster, from the M clusters, is indicative of known persons with one of the M predefined characteristic attributes. In one example, the M predefined characteristic attributes include one of height related attributes, walking-speed related attributes, area-coverage related attributes, and body segment-angle related attributes. In one example, the training dataset for the N known persons may be clustered using a fuzzy C-means clustering technique.

Subsequently, each of the G gait feature vectors is tagged with one of the M clusters. In an example, each of the G gait feature vectors may be tagged with one of the M clusters based on a distance between a respective gait feature vector and cluster centers of the M clusters. In one example, a gait feature vector is tagged to that cluster whose cluster center has a minimum Euclidean distance from the gait feature vectors. Further, a clustering score is determined for each of the M clusters. The clustering score for a respective cluster is a number of gait feature vectors tagged or associated with the respective cluster divided by G.

Finally, the unknown person is identified as one from amongst the N known persons based on the clustering scores for the M clusters and the classification scores for the N classes. Further, the people identification system combines or fuses the clustering scores and the classification scores for identification of the unknown person, thereby improving the accuracy of identification of the unknown person.

Furthermore, as described earlier, the skeleton data of the unknown person is received from the plurality of skeleton recording devices including the master skeleton recording device and the at least one slave skeleton recording device. Moreover, the skeleton recording devices are positioned in such a way that limitation of field of view of one skeleton recording device is compensated by other skeleton recording devices, the skeleton recording devices, in combination, provide a wider field of view. Also, the skeleton recording devices are time synchronized based on Network Time Protocol (NTP). Therefore, the skeleton recording devices act as a single unit and as a result, complexity and processing time of the skeleton data is substantially reduced. Moreover, the skeleton recording devices are positioned in such a way that limitation of field of view of one skeleton recording device is compensated by other skeleton recording devices, the skeleton recording devices, in combination, provide a wider field of view. Thus, overall coverage area increases and skeleton model of an unknown person is accurately captured.

The following disclosure describes system and method for identification of an unknown person using multiple skeleton recording devices. While aspects of the described system and method can be implemented in any number of different computing systems, environments, and/or configurations, embodiments for identification of an unknown person using multiple skeleton recording devices are described in the context of the following exemplary system(s) and method(s).

FIG. 1 illustrates a network environment 100 implementing a people identification system 102, in accordance with an embodiment of the present subject matter. In said embodiment, the people identification system 102 is for identification of an unknown person. In an example, the person may be from amongst N known persons.

In one implementation, the network environment 100 can be a public network environment, including thousands of individual computers, laptops, various servers, such as blade servers, and other computing devices. In another implementation, the network environment 100 can be a private network environment with a limited number of computing devices, such as individual computers, servers, and laptops.

The people identification system 102 may be implemented in a variety of computing systems, such as a laptop computer, a desktop computer, a notebook, a smartphone, a tablet, a workstation, a mainframe computer, a server, a network server, and the like. In one implementation, the people identification system 102 is communicatively coupled with skeleton recording devices through a network 108. In one example, the skeleton recording devices may be Kinect® devices that can record 3D skeleton models of any person. In another example, the skeleton recording devices may be any devices having a colored cameras and Infrared (IR) cameras.

As shown in FIG. 1, the skeleton recording devices include a master skeleton recording device 104 and a slave skeleton recording device 106. Further, although, one slave skeleton recording device 106 has been depicted in FIG. 1, there may be more than one slave skeleton recording device 106 connected to the people identification system 102.

In one implementation, the network 108 may be a wireless network, a wired network, or a combination thereof. The network 108 may also be an individual network or a collection of many such individual networks, interconnected with each other and functioning as a single large network, e.g., the Internet or an intranet. The network 108 may be implemented as one of the different types of networks, such as intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 108 may include a variety of network devices, including routers, bridges, servers, computing devices, storage devices, and the like.

According to an implementation, the people identification system 102 includes processor(s) 110, interface(s) 112, and memory 114 coupled to the processor(s) 110. The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 may be configured to fetch and execute computer-readable instructions stored in the memory 114.

The memory 114 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 112 may include a variety of software and hardware interfaces, for example, interfaces for peripheral device(s), such as a product board, a mouse, an external memory, and a printer. Additionally, the interface(s) 112 may enable the people identification system 102 to communicate with other devices, such as web servers and external repositories. The interface(s) 112 may also facilitate multiple communications within a wide variety of networks and protocol types, including wired networks, for example, LAN, cable, etc., and wireless networks, such as WLAN, cellular, or satellite. For the purpose, the interface(s) 110 may include one or more ports.

The people identification system 102 also includes module(s) 116 and data 118. The module(s) 116 include, for example, an extraction module 120, a classification module 122, a clustering module 124, an identification module 126, and other module(s) 128. The other modules 128 may include programs or coded instructions that supplement applications or functions performed by the people identification system 102. The data 118 may include training data 130 and other data 132. In one example, the training data 130 may include data relating to the plurality of known persons. Further, the other data 132, amongst other things, may serve as a repository for storing data that is processed, received, or generated as a result of the execution of one or more modules in the module(s) 116.

Although the data 118 is shown internal to the people identification system 102, it will be appreciated by a person skilled in the art that the data 118 can also be implemented external to the people identification system 102, wherein the data 118 may be stored within a database communicatively coupled to the people identification system 102. Further, the training data 130 stored in the database may be retrieved whenever an unknown person, from amongst the plurality of known persons, is to be identified by the people identification system 102. Furthermore, the training data 130 contained within such external database may be periodically updated. For example, new training data may be added into the database, existing training data 130 may be modified, or non-useful training data may be deleted from the database.

In one embodiment of the present subject matter, for the purpose of identification of the unknown person, the people identification system 102 is initially trained over the plurality of known persons and then the unknown person from amongst the plurality of known persons is identified through the people identification system 102. The people identification system 102 may be pre-trained, i.e., may not be trained in real-time; however, the identification of an unknown person is performed in real-time through the people identification system 102.

In an implementation, for training the people identification system 102 for the known persons, the extraction module 120 may receive an input from a user, say an administrator comprising a total number, N, of known persons and their respective unique identifier. A unique identifier of a known person uniquely defines and identifies the known person. The unique identifier may be name of the known person. In an example, if the unique identifiers may be person A, person B, person C, Person D, and so on.

Thereafter, the extraction module 120 of the people identification system 102 may receive skeleton data of each of the N known persons from a plurality of skeleton recording devices. According to one example, the extraction module 120 may receive the unique identifiers of the N known persons in a specific order, and receive the skeleton data of the N known persons according to the specific order. The skeleton data may include data of multiple skeleton joints of the known persons. The skeleton joints may include a head joint, a shoulder centre joint, a shoulder left joint, a shoulder right joint, a spine joint, a hand left joint, a hand right joint, an elbow right joint, an elbow left joint, a wrist right joint, a wrist left joint, a hip left joint, a hip right joint, a hip centre joint, a knee right joint, a knee left joint, a foot left joint, a foot right joint, an ankle right joint, and an ankle left joint.

In an implementation, the extraction module 120 initially receives a plurality of 3D skeleton models of each of the known persons from the skeleton recording devices. In one example, the extraction module 120 receives 3D skeleton models of each known person, from the master skeleton recording device 104 and from the slave skeleton recording device 106.

Although, it is possible that there may be more than one slave skeleton recording device 106, the description henceforth has been explained with reference to one slave skeleton recording device 106. The number of slave skeleton recording devices 106 to be deployed depends on a coverage area of a deployment environment in which the unknown person, from amongst the known persons, is to be identified. For example, if the deployment environment is a 12×12 feet room, then one master skeleton recording device 104 and one slave skeleton recording device 106 may be deployed to cover the area of the room, such that a complete skeleton model of any person can be captured. Further, locations for deploying the master skeleton recording device 104 and the slave skeleton recording device 106 depends on the architecture of the room and the field of view to be covered. The manner in which the master skeleton recording device 104 and the slave skeleton recording device 106 capture the 3D skeleton models, hereinafter referred to as skeleton models, of a known person is described henceforth.

According to an implementation, the master skeleton recording device 104 and the slave skeleton recording device 106 are interconnected and are positioned in such a way that limitation of field of view of one skeleton recording device is compensated by other skeleton recording device. Further, the master skeleton recording device 104 and the slave skeleton recording device 106 are time synchronized based on Network Time Protocol (NTP). Therefore, in combination, the master skeleton recording device 104 and the slave skeleton recording device 106 provide a wider field of view. In an implementation, each of the master skeleton recording device 104 and the slave skeleton recording device 106 includes an IR camera to capture skeleton models of any person.

In one implementation, the IR camera of the master skeleton recording device 104 is always ON. Whenever a known person appears in front of the master skeleton recording device 104, the master skeleton recording device 104 initiates a new event and sets a timer indicating the duration of capture of the 3D skeleton model of the known person. In an example, the duration of the timer may be 2 minutes. In said implementation, the master skeleton recording device 104 controls the working of the slave skeleton recording device 106 based on the appearance of the known person in front of the master skeleton recording device 104. For example, when a known person appears in front of the master skeleton recording device 104, the master skeleton recording device 104 sends a message to the slave skeleton recording device 106 to turn ON its IR camera according to the requirement. As a result, inference between the master skeleton recording device 104 and the slave skeleton recording device 106 is substantially reduced. In a scenario where multiple slave skeleton recording devices are deployed, even if one or more slave skeleton recording devices become non-functional, the remaining slave skeleton recording devices continue to capture the skeleton models.

Further, the master skeleton recording device 104 and the slave skeleton recording device 106, individually, capture the skeleton models of the known person for the duration of the timer, set by the master skeleton recording device 104. Therefore, when the timer is timed out, the master skeleton recording device 104 turns OFF its IR camera and also sends a message to the slave skeleton recording device 106 to turn OFF its IR camera.

Furthermore, since the master skeleton recording device 104 and the slave skeleton recording device 106 have a separate co-ordinate system, the extraction module 120 may map the skeleton data into a single co-ordinate system. In one implementation, the skeleton data obtained from the skeleton models, captured by the master skeleton recording device 104, is linearly shifted with respect to skeleton data obtained from the skeleton models, captured by the slave skeleton recording device 106, so that the skeleton data can be mapped into a single co-ordinate system.

Thereafter, the extraction module 120 determines joint coordinates of the multiple skeleton joints from the skeleton data of the known person. In an example, the extraction module 120 determines Cartesian joint coordinates, i.e., x, y, and z coordinates of each of the skeleton joints of the known person from the skeleton data. Based on the joint coordinates, the extraction module 120 detects one or more gait cycles of the known person. In one implementation, the extraction module 120 detects full-gait cycles based on the skeleton data. In another implementation, the extraction module 120 detects half-gait cycles based on the skeleton data. A full-gait cycle may be understood as a cycle that starts with right-ankle or left-ankle forward and ends with the same right-ankle or left-ankle forward, and a half-gait cycle may be understood as a cycle that starts with right-ankle or left-ankle forward and ends with left-ankle or right-ankle forward, respectively. The description hereinafter is explained with reference to half-gait cycle only for the purpose of explanation, it should not be construed as a limitation, and it is well appreciated that the full-gait cycles can also be computed for the purpose of identifying the unknown person. As described earlier, the extraction module 120 maps the skeleton data captured by the skeleton recording devices in a single co-ordinate system, therefore, although both the master skeleton recording device 104 and the slave skeleton recording device 106 capture the skeleton models of the known person, one continuous walking pattern is detected for the known person.

For each of the half-gait cycles, the extraction module 120 extracts a training gait feature vector for the known person based on the skeleton data. The training gait feature vector may include a predefined gait feature set having a plurality of static and dynamic gait features, such as area related gait features, angle related gait features, dynamic centroid distance related gait features, and speed related gait features. The area related gait features may include, without limitation, mean of area occupied by upper body portion and mean of area occupied by lower body portion of the known person. According to one implementation, the area related features are mathematically represented by the expression (1) provided below:

$$f_A = \{f_{au}^{mean}, f_{al}^{mean}\} \quad (1)$$

In the above expression, ($f_{au}^{mean}$) represents mean of area occupied by the upper body portion, ($f_{al}^{mean}$) represents mean of area occupied by the lower body portion, and ($f_A$) represents area related gait features.

The angle related gait features may include, without limitation, mean, standard deviation and maximum of angle of the upper left leg relative to the vertical axis, angle of the lower left leg relative to the upper left leg, and angle of the left ankle relative to horizontal axis. The angle related gait features may also include mean, standard deviation and maximum of angle of the upper right leg relative to the vertical axis, angle of the lower right leg relative to the upper right leg, and angle of the right ankle relative to horizontal axis. The angle related gait features may be represented by ($f_{AG}$).

Further, the dynamic centroid distance related gait feature are extracted based on computing mean, standard deviation, and maximum of Euclidean distances between centroid of the upper body portion and centroids of right hand, left hand, right leg, and left leg of the known person. The dynamic centroid distance related gait features are mathematically represented by the expression (2) provided below:

$$f_D = \{f_{dj}^{mean}, f_{dj}^{stddev}, f_{dj}^{max}\}, j = \{1, \ldots, 4\} \quad (2)$$

In the above expression, ($f_{dj}^{mean}$) represents mean of Euclidean distances between the centroid of the upper body portion and the centroids of right hand, left hand, right leg, and left leg, ($f_{dj}^{stddev}$) represents standard deviation of Euclidean distances between centroid of the upper body portion and centroids of right hand, left hand, right leg, and left leg, ($f_{dj}^{max}$) represents maximum of Euclidean distances between centroid of the upper body portion and centroids of right hand, left hand, right leg, and left leg, and ($f_D$) represents dynamic centroid distance related gait features.

The speed related gait features may include walking speed. The speed related gait features may be represented by ($f_{SD}$).

Thus, the gait feature vector is extracted for each of the one or more gait cycles. In one example, for each of the gait cycles, 2 area related gait features ($f_A$), 18 angle related gait features ($f_{AG}$), 12 dynamic centroid distance related gait features ($f_D$), and 14 speed related gait features ($f_{SD}$) are extracted. In the context of the present subject matter, the extracted gait feature vector is mathematically represented by the expression provided below:

$$f = \{f_A, f_{AG}, f_D, f_{SD}\} \quad (3)$$

In the above expression, (f) represents the gait feature vector, ($f_A$) represents area related gait features, ($f_{AG}$) represents angle related gait features, ($f_D$) represents dynamic centroid distance related gait features, and ($f_{SD}$) represents speed related gait features.

The extraction module 120 repeats the process as described above to obtain the training feature vectors for all the known persons, from the skeleton data of the known persons. Further, although, it has been described that the extraction module 120 computes one training gait feature vector for each of the N known persons, in an implementation, the extraction module 120 may extract G training gait feature vector for each of the N known persons. In an example, G may be in a range from about 35 to 45.

Thereafter, the extraction module 120 populates the G training gait feature vectors for each of the N known persons in a training dataset and the people identification system 102 is trained for the training dataset using a classifier. The classifier may generate a training model for each of the N known persons, based on the G gait feature vectors for the respective known person. In one example, the classifier may be a Support Vector Machine (SVM) classifier. The training dataset may be stored in the training data 130.

Although it has been described the people identification system 102 extracts the training gait feature vectors for the known persons; however, in an implementation, the training gait feature vectors for the known persons may be extracted by an external computing device and stored in an external memory. The people identification system 102 may obtain the training gait feature vectors, or a training dataset having the training gait feature vectors, from the external memory for training the people identification system 102.

In an implementation, for identification of the unknown person in real-time, the extraction module 120 may receive skeleton data of the unknown person from the master skeleton recording device 104 and the slave skeleton recording device 106. The skeleton data of the unknown person is based on the skeleton models of the unknown person, captured by the master skeleton recording device 104 and the slave skeleton recording device 106 in a similar manner as described earlier for the known person. The extraction module 120 maps the skeleton data, received from the master skeleton recording device 104 and the slave skeleton recording device 106, into a single co-ordinate system.

Thereafter, the extraction module 120 determines joint coordinates of the multiple skeleton joints from the skeleton data of the unknown person. In an example, the extraction module 120 determines Cartesian joint coordinates, i.e., x, y, and z coordinates of each of the skeleton joints from the skeleton data of the unknown person. Based on the joint coordinates, the extraction module 120 detects one or more gait cycles of the unknown person.

Further, the extraction module 120 extracts G gait feature vectors from the skeleton data of the unknown person. Each of the G gait feature vectors may include area related gait features, angle related gait features, dynamic centroid distance related gait features, and speed related gait features. In one example, the extraction module 120 extracts each of the G gait feature vectors in a manner as described earlier, based on expression (3).

Subsequently, the classification module 122 classifies each of the G gait feature vectors into one of N classes based on the training dataset for the N known persons. A class, from the N classes, represents one of the N known persons. In an example, based on the known persons, person A may be represented by class 1, person B may be represented by class 2, person C may be represented by class 3, and so on. In one implementation, the classification module 122 may retrieve the training dataset from the training data 130 and classify each of the G gait feature vectors based on the training models, for the N known persons, generated from the training dataset during the training of the people identification system 102.

Thereafter, the classification module 122 computes a classification score for each of the N classes. The classification score for a respective class is a number of gait feature vectors classified in the respective class divided by G. The classification score for each of the N classes is computed based on equation (4) provided below.

$$P_{CLASS}(i) = \frac{w_i}{G}, \quad i \in \{1, \ldots, N\} \quad (4)$$

where $P_{CLASS}(i)$ represents a classification score for the $i^{th}$ class, G represents a number of gait feature vectors extracted from the skeleton data of the unknown person, and $w_i$ represents a number of gait feature vectors classified in the $i^{th}$ class.

According to an implementation, the classification scores for the N classes may be represented by $$P_{CLASS} = \{P_{CLASS}(1), P_{CLASS}(2), \ldots, P_{CLASS}(N)\} \quad (5)$$

In an implementation, the clustering module 124 clusters the training dataset for the N known persons into M clusters based on M predefined characteristic attributes of the N known persons. In one example, M is equal to 3. Further, M predefined characteristic attributes include at least one of height related attributes of small, medium and tall, walking-speed related attributes of slow, medium and fast, area-coverage related attributes of small, medium and large, and body segment-angle related attributes of small, medium and large. In one example, the clustering module 124 determines the characteristic attributes based on the joint coordinates of the known persons and the extracted gait features which are unique to these characteristic attributes. In an example, the clustering module 124 clusters the training dataset for the N known persons using a fuzzy C-means clustering technique or a K-means clustering technique.

Further, the clustering module 124 tags each of the G gait feature vectors of an unknown person with one of the M clusters based on a distance between a respective gait feature vector and cluster centers of the M clusters. Tagging of a gait feature vector may be understood as assigning or linking the gait feature vector to a cluster. For example, if there are 3 clusters (for M=3), say 1, 2 and 3, then each of the G gait features can be tagged to cluster 1, cluster 2, or cluster 3, according to its Euclidean distance from the cluster centers of the 3 clusters. In an example, for tagging a gait feature vector, a Euclidean distance of the gait feature vector from the cluster center of each of the 3 clusters is determined. If the gait feature vector is nearest to cluster 3, i.e., the distance between the gait feature vector and the cluster center of cluster 3 is minimum, then the gait feature vector is tagged with cluster. In one example, the distance may be a city-block distance or a Euclidean distance. In an example, the clustering module 124 tags each of the G gait feature vectors using a clustering technique, such as a K-means clustering technique and a fuzzy C-means clustering technique.

Thereafter, the clustering module 124 determines a clustering score for each of the M clusters. The clustering score for a respective cluster is a number of gait feature vectors of the unknown person tagged or associated with the respective cluster divided by G. The clustering score for each of the M clusters is determined based on equation (7) provided below.

$$P_{CLUSTER}(i) = \frac{u_i}{G}, \quad i \in \{1, \ldots, M\} \tag{7}$$

where $P_{CLUSTER}(i)$ represents a clustering score for the $i^{th}$ cluster, G represents a number of gait feature vectors extracted from the skeleton data of the unknown person, and $u_i$ represents a number of gait feature vectors associated with the $i^{th}$ cluster.

According to an implementation, the clustering scores for the M clusters may be represented by $$P_{CLUSTER} = \{P_{CLUSTER}(1), P_{CLUSTER}(2), \ldots, P_{CLUSTER}(M)\} \tag{8}$$

Further, in an implementation, the identification module 126 determines a height of the unknown person from each of the G gait feature vectors for the unknown person and identifies noise gait feature vectors from the G gait feature vectors for the unknown person. In one example, if the height determined from a gait feature vector is less than a first predefined height value and more than a second predefined height value, then that gait feature vector is identified as the noise gait feature vector. In an example, the first predefined height value may be 4 feet 5 inches and the second predefined height value may be 6 feet 3 inches. Therefore, if the height of the unknown person, determined from the gait feature vector, does not lie between 4 feet 5 inches to 6 feet 3 inches, then that gait feature vector may be considered to have a noise. In one implementation, the identification module 126 may compute a noise score using equation (9) provided below:

$$P_{NOISE} = \frac{n}{Z+G} \tag{9}$$

where $P_{NOISE}$ is the noise score, n is a number of noise gait feature vectors, G is the number of gait feature vectors extracted from the skeleton data of the unknown person, and Z is a total number of gait feature vectors in the training dataset for the N known persons.

Therefore, the people identification system 102 also considers uncertainty due to presence of noise in the skeleton data. As a result, the people identification system 102 is insensitive to small variations, in terms of noise, present in the skeleton data. Therefore, the unknown person can be reliably identified in real-time.

Thereafter, the identification module 126 computes a fusion score for each of the N classes. The fusion score for an $i^{th}$ class is computed based on equation (10) provided below:

$$P_{FUSION}(i) = \tag{10}$$
$$\frac{1}{K} \Sigma_{(P_{CLUSTER} \cup P_{NOISE}) \cap P_{CLASS} = i}(P_{CLUSTER} + P_{NOISE}) * P_{CLASS}$$

where $P_{FUSION}(i)$ is the fusion score for $i^{th}$ class, $i \in \{1, \ldots, N\}$, $K = 1 - \Sigma_{(P_{CLUSTER} \cup P_{NOISE}) \cap P_{CLASS} = \phi}(P_{CLUSTER} + P_{NOISE}) * P_{CLASS}$, $P_{CLASS}$ is the classification score for the $i^{th}$ class, and $P_{CLUSTER}$ is the clustering score for that cluster which is indicative of the known person represented by the $i^{th}$ class.

In one implementation, the identification module 126 identifies the unknown person, from amongst the N known persons, based on the fusion score for each of the N classes. In one example, the identification module 126 accurately identifies the unknown person as the known person for the class for which the fusion score is maximum. For example, based on the known persons, if person A is represented by class 1, person B is represented by class 2, person C is represented by class 3, and so on, and if the fusion score of class 2 is maximum, the unknown person is identified as person B.

Figure 2:
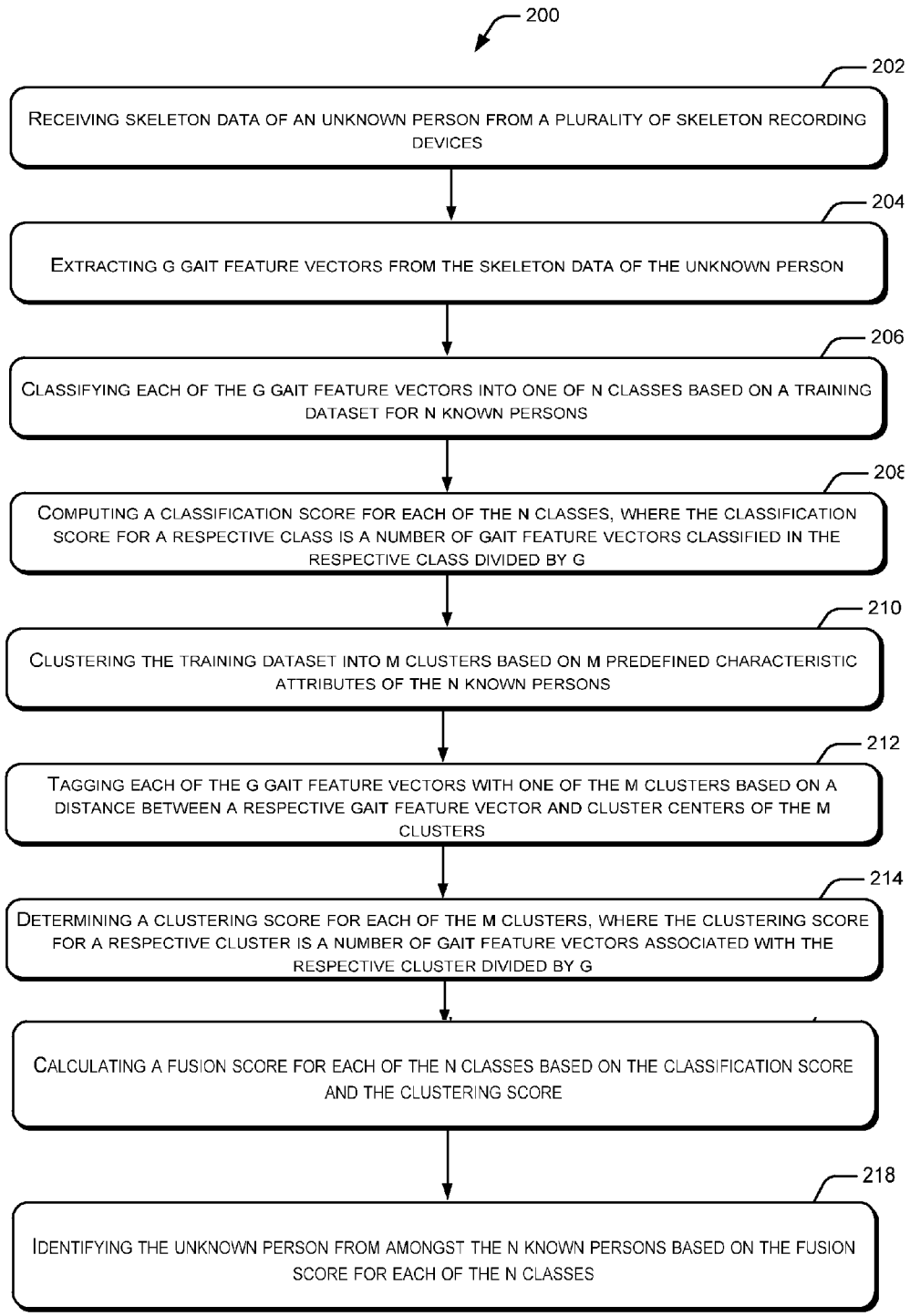
FIG. 2 illustrates a method for identifying an unknown person from amongst N known persons, according to an embodiment of the present subject matter.

FIG. 2 illustrates a method 200 for identifying an unknown person from amongst N known persons, according to an embodiment of the present subject matter. The method 200 is implemented in a computing device, such as a people identification system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Furthermore, the method can be implemented in any suitable hardware, software, firmware or combination thereof.

At block 202, the method 200 includes receiving skeleton data of an unknown person from a plurality of skeleton recording devices. The unknown person to be identified may be from amongst known persons for which the people identification system is trained. In an implementation, the skeleton recording devices capture 3D skeleton models of the unknown person. A 3D skeleton model of an unknown person may represent skeleton data comprising multiple skeleton joints of the unknown person. In one implementation, the extraction module 120 receives skeleton data of the unknown person from multiple skeleton recording devices.

At block 204, the method 200 includes extracting G gait feature vectors from the skeleton data of the unknown person. To extract the gait feature vectors, joint coordinates of each of the skeleton joints are determined from the skeleton data of the unknown person. Once the joint coordinates of the skeleton joints are determined, G gait feature vectors are extracted from the skeleton data of the unknown person. In an example, a gait feature vector may include static and dynamic gait features, such area related gait features, angle related gait features, dynamic centroid distance related gait features, and speed related gait features. In one implementation, the extraction module 120 extracts G gait feature vectors from the skeleton data of the unknown person.

At block 206, the method 200 includes classifying each of the G gait feature vectors into one of N classes based on a training dataset for N known persons. The training dataset for the N known persons may include G gait feature vectors of the known persons. In an example, a class, from the N classes, represents one of the N known persons. In one implementation, the classification module 122 classifies each of the G gait feature vectors into one of N classes.

At block 208, the method 200 includes computing a classification score for each of the N classes, where the classification score for a respective class is a number of gait feature vectors classified in the respective class divided by G. In one implementation, the classification module 122 computes a classification score for each of the N classes.

At block 210, the method 200 includes clustering the training dataset into M clusters based on M predefined characteristic attributes of the N known persons. In one example, M predefined characteristic attributes include at least one of height related attributes of small, medium and tall, walking-speed related attributes of slow, medium and fast, area-coverage related attributes of small, medium and large, and body segment-angle related attributes of small, medium and large. In one implementation, the clustering module 124 clusters the training dataset into M clusters based on M predefined characteristic attributes of the N known persons.

At block 212, the method 200 includes tagging each of the G gait feature vectors with one of the M clusters based on a distance between a respective gait feature vector and cluster centers of the M clusters. Tagging of a gait feature vector may be understood as assigning or linking the gait feature vector to a cluster. In one implementation, the clustering module 124 tags each of the G gait feature vectors with one of the M clusters.

At block 214, the method 200 includes determining a clustering score for each of the M clusters, where the clustering score for a respective cluster is a number of gait feature vectors associated with the respective cluster divided by G. In one implementation, the clustering module 124 determines a clustering score for each of the M clusters.

At block 216, the method 200 includes calculating a fusion score for each of the N classes based on the classification score and the clustering score. The fusion score is also calculated based on a noise score. The noise score is calculated based on a number of noise gait feature vectors, the number of gait feature vectors extracted from the skeleton data of the unknown person, and a total number of gait feature vectors in the training dataset for the N known persons. In one implementation, the identification module 126 calculates a fusion score for each of the N classes.

At block 218, the method 200 includes identifying the unknown person from amongst the N known persons based on the fusion score for each of the N classes. In one example, the identification module 126 accurately identifies the unknown person as the known person for the class for which the fusion score is maximum.

Although embodiments for methods and systems for identifying an unknown person from amongst a plurality of known persons have been described in a language specific to structural features and/or methods, it is to be understood that the invention is not necessarily limited to the specific features or methods described. Rather, the specific features and methods are disclosed as exemplary embodiments for identifying an unknown person from amongst a plurality of known persons.

We claim:

1. A method for identifying an unknown person from amongst N known persons, the method comprising:
   receiving skeleton data of the unknown person from a plurality of skeleton recording devices, wherein the skeleton data comprises data of multiple skeleton joints of the unknown person;
   extracting, by a processor, G gait feature vectors from the skeleton data of the unknown person;
   classifying, by the processor, each of the G gait feature vectors into one of N classes based on a training dataset for the N known persons, wherein a class, from the N classes, represents one of the N known persons;
   computing, by the processor, a classification score for each of the N classes, wherein the classification score for a respective class is a number of gait feature vectors classified in the respective class divided by G;
   clustering, by the processor, the training dataset for the N known persons into M clusters based on M predefined characteristic attributes of the N known persons, wherein a cluster, from the M clusters, is indicative of known persons with one of the M predefined characteristic attributes;
   tagging, by the processor, each of the G gait feature vectors with one of the M clusters based on a distance between a respective gait feature vector and cluster centers of the M clusters;
   determining, a clustering score for each of the M clusters, wherein the clustering score for a respective cluster is a number of gait feature vectors associated with the respective cluster divided by G; and
   identifying the unknown person, from amongst the N known persons, based on the clustering scores and the classification scores.

2. The method as claimed in claim 1, wherein the plurality of skeleton recording devices comprises:
   a master skeleton recording device; and
   at least one slave skeleton recording device time synchronized with the master skeleton recording device.

3. The method as claimed in claim 1, wherein the training dataset for the N known persons comprises G gait feature vectors for the N known persons.

4. The method as claimed in claim 1 further comprising:
   determining a height of the unknown person from each of the G gait feature vectors for the unknown person;
   identifying noise gait feature vectors from the G gait feature vectors for the unknown person, wherein the height determined from the noise gait feature vectors is less than a first predefined height value and more than a second predefined height value; and
   computing a noise score $P_{Noise}$ based on:

$$P_{NOISE} = \frac{n}{G+Z}$$

wherein n is a number of noise gait feature vectors, and Z is a total number of gait feature vectors in the training dataset for the N known persons.

5. The method as claimed in claim 1 further comprising:
   computing a fusion score $P_{Fusion}$ for each of the N classes, wherein the fusion score $P_{Fusion}(i)$ for an $i^{th}$ class is computed based on:

$$P_{FUSION}(i) = \frac{1}{K}\Sigma_{(P_{CLUSTER} \cup P_{NOISE}) \cap P_{CLASS}=i}(P_{CLUSTER} + P_{NOISE}) * P_{CLASS},$$

wherein $i \in \{1, \ldots, N\}$, $K=1-\Sigma_{(P_{CLUSTER} \cup P_{NOISE}) \cap P_{CLASS}=\Phi}(P_{CLUSTER}+P_{NOISE})*P_{CLASS}$, $P_{CLASS}$ is the classification score for the $i^{th}$ class, an $P_{CLUSTER}$ is the clustering score for one of the M clusters which is indicative of the known person represented by the $i^{th}$ class, and
   wherein the unknown person is identified from amongst the N known persons based on the fusion score $P_{FUSION}$ for each of the N classes.

6. The method as claimed in claim 1, wherein each of the G gait feature set comprises area related gait features, angle related gait features, dynamic centroid distance related gait features, and speed related gait features.

7. The method as claimed in claim 1, wherein M is equal to 3, and wherein the M predefined characteristic attributes comprise three height related attributes of small, medium and tall.

8. The method as claimed in claim 1, wherein M is equal to 3, and wherein the M predefined characteristic attributes comprise three walking-speed related attributes of slow, medium and fast.

9. The method as claimed in claim 1, wherein M is equal to 3, and wherein the M predefined characteristic attributes comprise three area-coverage related attributes of small, medium and large.

10. The method as claimed in claim 1, wherein M is equal to 3, and wherein the M predefined characteristic attributes comprise three body segment-angle related attributes of small, medium and large.

11. The method as claimed in claim 1, wherein the clustering of the training dataset for the N known persons is done using a fuzzy C-means clustering technique.

12. A people identification system for identifying an unknown person from amongst N known persons, the people identification system comprising:
a processor;
an extraction module coupled to, and executable by, the processor to,
receive skeleton data of the unknown person from a plurality of skeleton recording devices, wherein the skeleton data comprises data of multiple skeleton joints of the unknown person; and
extract G gait feature vectors from the skeleton data of the unknown person;
a classification module coupled to, and executable by, the processor to,
classify each of the G gait feature vectors into one of N classes based on a training dataset for the N known persons, wherein a class, from the N classes, represents one of the N known persons; and
compute a classification score for each of the N classes, wherein the classification score for a respective class is a number of gait feature vectors classified in the respective class divided by G;
a clustering module coupled to, and executable by, the processor to,
cluster the training dataset for the N known persons into M clusters based on M predefined characteristic attributes of the N known persons, wherein a cluster, from the M clusters, is indicative of known persons with one of the M predefined characteristic attributes;
tag each of the G gait feature vectors with one of the M clusters based on a distance between a respective gait feature vector and cluster centers of the M clusters; and
determine a clustering score for each of the M clusters, wherein the clustering score for a respective cluster is a number of gait feature vectors associated with the respective cluster divided by G; and
an identification module coupled to, and executable by, the processor to,
identify the unknown person, from amongst the N known persons, based on the clustering scores and the classification scores.

13. The people identification system as claimed in claim 12, wherein the identification module further:
determines a height of the unknown person from each of the G gait feature vectors for the unknown person;
identifies noise gait feature vectors from the G gait feature vectors for the unknown person, wherein the height determined from the noise gait feature vectors is less than a first predefined height value and more than a second predefined height value; and
computes a noise score $P_{Noise}$ based on:

$$P_{NOISE} = \frac{n}{G+Z}$$

wherein n is a number of noise gait feature vectors, and Z is a total number of gait feature vectors in the training dataset for the N known persons.

14. The people identification system as claimed in claim 12, wherein the identification module further:
computes a fusion score $P_{Fusion}$ for each of the N classes, wherein the fusion score $P_{Fusion}(i)$ for an $i^{th}$ class is computed based on:

$$P_{FUSION}(i) = \frac{1}{K}\Sigma_{(P_{CLUSTER} \cup P_{NOISE}) \cap P_{CLASS}=i}(P_{CLUSTER} + P_{NOISE}) * P_{CLASS},$$

wherein $i \in \{1, \ldots, N\}$, $K=1-\Sigma_{(P_{CLUSTER} \cup P_{NOISE}) \cap P_{CLASS}=\Phi}$ $(P_{CLUSTER}+P_{NOISE})*P_{CLASS}$, $P_{CLASS}$ is the classification score for the $i^{th}$ class, and $P_{CLUSTER}$ is the clustering score for one of the M clusters which is indicative of the known person represented by the $i^{th}$ class, and
wherein the unknown person is identified from amongst the N known persons based on the fusion score $P_{FUSION}$ for each of the N classes.

15. A non-transitory computer-readable medium having embodied thereon a computer program for executing a method comprising:
receiving skeleton data of an unknown person from a plurality of skeleton recording devices, wherein the skeleton data comprises data of multiple skeleton joints of the unknown person;
extracting G gait feature vectors from the skeleton data of the unknown person;
classifying each of the G gait feature vectors into one of N classes based on a training dataset for N known persons, wherein a class, from the N classes, represents one of the N known persons;
computing a classification score for each of the N classes, wherein the classification score for a respective class is a number of gait feature vectors classified in the respective class divided by G;
clustering the training dataset for the N known persons into M clusters based on M predefined characteristic attributes of the N known persons, wherein a cluster, from the M clusters, is indicative of known persons with one of the M predefined characteristic attributes;
tagging each of the G gait feature vectors with one of the M clusters based on a distance between a respective gait feature vector and cluster centers of the M clusters;
determining a clustering score for each of the M clusters, wherein the clustering score for a respective cluster is a number of gait feature vectors associated with the respective cluster divided by G; and
identifying the unknown person, from amongst the N known persons, based on the clustering scores and the classification scores.

16. The non-transitory computer-readable medium as claimed in claim 15, wherein the plurality of skeleton recording devices comprises:
- a master skeleton recording device; and
- at least one slave skeleton recording device time synchronized with the master skeleton recording device.

17. The non-transitory computer-readable medium as claimed in claim 15, wherein the training dataset for the N known persons comprises G gait feature vectors for the N known persons.

18. The non-transitory computer-readable medium as claimed in claim 15 further comprising:
- determining a height of the unknown person from each of the G gait feature vectors for the unknown person;
- identifying noise gait feature vectors from the G gait feature vectors for the unknown person, wherein the height determined from the noise gait feature vectors is less than a first predefined height value and more than a second predefined height value; and
- computing a noise score $P_{Noise}$ based on:

$$P_{NOISE} = \frac{n}{G+Z}$$

wherein n is a number of noise gait feature vectors, and Z is a total number of gait feature vectors in the training dataset for the N known persons.

19. The non-transitory computer-readable medium as claimed in claim 15 further comprising:

computing a fusion score $P_{Fusion}$ for each of the N classes, wherein the fusion score $P_{Fusion}(i)$ for an $i^{th}$ class is computed based on:

$$P_{FUSION}(i) = \frac{1}{K}\Sigma_{(P_{CLUSTER} \cup P_{NOISE}) \cap P_{CLASS}=i}(P_{CLUSTER} + P_{NOISE}) * P_{CLASS},$$

wherein $i \in \{1, \ldots, N\}$ $K=1-\Sigma_{(P_{CLUSTER} \cup P_{NOISE}) \cap P_{CLASS}=\Phi}(P_{CLUSTER}+P_{NOISE})*P_{CLASS}$, $P_{CLASS}$ is the classification score for the $i^{th}$ class, and $P_{CLUSTER}$ is the clustering score for one of the M clusters which is indicative of the known person represented by the $i^{th}$ class, and wherein the unknown person is identified from amongst the N known persons based on the fusion score $P_{FUSION}$ for each of the N classes.

20. The non-transitory computer-readable medium as claimed in claim 15, wherein each of the G gait feature set comprises area related gait features, angle related gait features, dynamic centroid distance related gait features, and speed related gait features.

* * * * *